United States Patent [19]

Kent et al.

[11] 4,101,494

[45] Jul. 18, 1978

[54] TIRE SEALING AND BALANCING AGENT

[75] Inventors: Jerry B. Kent; Peter P. Augostini, both of Arlington, Tex.

[73] Assignee: Wobaco Trust, Ltd. Trustee, Nassau, The Bahamas

[21] Appl. No.: 712,516

[22] Filed: Aug. 9, 1976

[51] Int. Cl.² .............................................. C08J 3/20
[52] U.S. Cl. ................................. 260/29.6 B; 152/347; 252/72; 260/29.6 BE; 260/29.6 BM; 260/42.51; 260/42.55
[58] Field of Search .................. 152/347; 260/29.6 B, 260/29.6 BE, 29.6 BM, 42.51, 42.55; 252/72

[56] References Cited

U.S. PATENT DOCUMENTS

| | | | |
|---|---|---|---|
| 2,622,044 | 12/1952 | Martens | 260/29.6 BE |
| 2,693,438 | 11/1954 | Ward | 260/29.6 B |
| 3,034,998 | 5/1962 | Hatch | 252/72 |
| 3,167,522 | 1/1965 | Shulman | 252/72 |
| 3,249,568 | 5/1966 | Reis | 260/42.51 |
| 3,282,874 | 11/1966 | Friedrich et al. | 252/72 |
| 3,352,696 | 11/1967 | Wallace | 152/347 |
| 3,352,696 | 11/1967 | Wallace | 152/347 |
| 3,860,539 | 1/1975 | Miyazato | 152/347 |

*Primary Examiner*—Eugene C. Rzucidlo
*Attorney, Agent, or Firm*—Gerald G. Crutsinger; Larry B. Dwight

[57] ABSTRACT

A tire sealant composition which possesses the added ability of operating as a tire balancing composition is provided. Such composition comprises a fibrous component of asbestos fibers and a polyvinyl alcohol-containing liquid component. The composition has a viscosity of about 1000 to about 2200 cps at 100° F.

13 Claims, No Drawings

TIRE SEALING AND BALANCING AGENT

BACKGROUND OF THE INVENTION

The problem of air loss due to the puncturing of air-containing articles such as pneumatic tires has been long appreciated. A number of divergent approaches for sealing holes formed in the articles have been adopted. One of the earliest methods of repair, and as disclosed in U.S. Pat. No. 628,192, involved introduction of India rubber into an air tube partly filled with fibrous material in a loose, flocculent or fluffy condition. In U.S. Pat. No. 2,055,797 a relatively non-flowing, self-sealing composition containing masticated rubber is disclosed. U.S. Pat. No. 2,765,018 discloses yet another self-sealing rubber composition. More recently, as disclosed in U.S. Pat. Nos. 3,860,539 and 3,881,537, aqueous dispersions of adhesives and finely divided rubber particles have also been employed as tire sealants.

The problems revolving about wheel imbalance have also been long extant. Balancing compositions have been developed utilizing free moving globular materials, such as buckshot, and free flowing liquids — such as mercury. Most recently, the use of particulate flowable weighting material, such as bentonite or barite, is disclosed in U.S. Pat. No. 3,436,551.

SUMMARY OF THE INVENTION

The present invention provides a composition which, when introduced within a pneumatic tire, functions as a tire sealant and balancing composition, and proffered as a definite improvement over previous schemes such as represented by the above referred to prior art.

The tire sealing and balancing composition of this invention is comprised of a fibrous component of asbestos fibers and an aqueous solution of polyvinyl alcohol. Such composition has a viscosity of from about 1000 to 2200 cps at 100° F. The asbestos fibers are preferably of varying size and from about 0.01 to about 3.0 inches in length. The fibrous component may also contain fiberglass fibers, the ratio of asbestos fibers to fiberglass fibers being from about 20:1 to about 100:1. Where both asbestos and fiberglass fibers are employed the asbestos fibers are from about 0.01 to about 3.0 inches in length and the fiberglass fibers are from about .25 inches to about 0.125 inches in length. The fibers preferably comprise from about 2% to about 8% by weight of said tire balancing and sealing composition.

In the operation of this invention, when a puncture or rupture occurs in the tire, the fibers at or near the locus of the puncture will be forced into the opening by the pressure differential existing between the interior and exterior of the tire and the polyvinyl alcohol liquid will flow around the fibers, dry upon exposure to a relative humidity less than 80 percent, to thus form a complete seal.

Sealing where the fibrous component comprises fiberglass and asbestos operates in the following manner:

The fiberglass fibers, which are very stiff, jam together and form a loose fill, with the fiber ends penetrating into the rubber at the puncture, and with the fiberglass arranged in a rigid and random manner.

The more flexible asbestos fibers pack around the fiberglass fibers forming a tight plug.

The polyvinyl alcohol, upon exposure at the locus of the plug, dries and completes the seal. Drying occurs upon exposure to a relative humidity of less than 80 percent.

The balancing function is attributable to the disposition of the composition which is distributed against the interior portion of the tire by centrifugal force. Irregularities within the tire are filled with the composition, thereby increasing the weight at the weight deficient positions.

DETAILED DESCRIPTION OF THE INVENTION

As noted in the summary of the invention, the tire sealing and balancing composition is comprised of two essential components, and namely: a fibrous component and a liquid component, the latter comprising a solution of polyvinyl alcohol. Other compatible solvents wherein polyvinyl alcohol is soluble may be used in place of water; however, as is evident, water is the most economical and readily available solvent.

In the tire balancing and sealing composition the amount of polyvinyl alcohol present is expressed, relative to the water content, by ratio of polyvinyl alcohol to water, this being from about 0.5:100 to about 5.0:100. The preferred ratio of polyvinyl alcohol to water is from about 0.5:100 to 1.0:100.

The polyvinyl alcohol employed in the tire sealing and balancing composition may be of low, medium or high viscosity and may be partially hydrolyzed, fully hydrolyzed or super hydrolyzed.

Polyvinyl alcohols are manufactured by polymerizing vinyl esters or vinyl acetates and hydrolyzing the polymers to the alcohol. The degree of polymerization is reflected by solution viscosity and is specified by the viscosity of a 4% aqueous solution.

One preferred polyvinyl alcohol is fully hydrolyzed and of medium viscosity. An example of such a polyvinyl alcohol is VINOL 325 manufactured by Air Products, Wayne, Pennsylvania. VINOL 325 is a polyvinyl alcohol from 98.0 to 98.8 percent hydrolyzed polyvinyl acetate, and a 4% by weight aqueous solution has a viscosity of 28–32 cps as measured with a Brookfield viscometer, Model LVF, #1 spindle, 60 rpm, 20° C.

Another preferred polyvinyl alcohol is partially hydrolyzed and of medium viscosity. An example of such a polyvinyl alcohol is VINOL 523, also manufactured by Air Products, Wayne, Pa. VINOL 523 is a polyvinyl alcohol of from 87.0–89.0 percent hydrolyzed polyvinyl acetate, and a 4% by weight aqueous solution of same has a viscosity of 28–32 cps as measured with a Brookfield viscometer, Model LVF, #1 spindle, 60 rpm, 20° C.

The fibrous component is comprised of asbestos fibers. Preferably the fibrous component consists of from about 4% to about 10% by weight of said tire balancing and sealing composition.

These asbestos fibers may be of varying length, preferably of a length of from about 0.01 to about 3.0 inches. A mixture of fibers of varying length and within the foregoing range, with the predominant lengths falling within the range of from about 0.5 to about 1.2 inches, is most preferred. The short and long fibers facilitate sealing of small and large punctures respectively.

The fibrous component may also contain fiberglass fibers, the ratio of asbestos to fiberglass fibers being from about 20:1 to about 100:1. The fiberglass fibers preferably are about 0.25 inches ± 0.125 inches in length.

In preparing the tire sealing and balancing composition, the fibrous component is presoaked by immersion in water prior to introduction of the fibrous component into the aqueous solution of polyvinyl alcohol. Presoaking functions to reduce air entrapment and wetting time. Preferably the water utilized for presoaking contains a wetting agent which may be of either the cationic or anionic or non-ionic type. Examples of such agents are ADVOWET-33, a non-ionic non-foaming active wetting agent manufactured by Advance Solvents and Chemical Corporation of New York, New York; INTERSTAB 33, a wetting agent manufactured by Interstate Chemicals, Inc., 500 Jersey Avenue, New Brunswick, N.J.; and FC 431, a wetting agent manufactured by Minnesota, Minning and Manufacturing Company.

To prevent corrosion of the wheel upon which the tire is mounted, a corrosion inhibitor may be added to the tire sealing and balancing composition. The corrosion inhibitor may be in an amount of, by weight, from about 0.5 to about 10 percent of the tire balancing and sealing composition. Examples of corrosion inhibitors which may be added to the composition are potassium dichromate and sodium tetraborate pentahydrate. A composition of sodium tetraborate, sodium metasilicate and potassium tripolyphosphate is also suitable.

The preferred inhibitors are potassium dichromate and sodium tetraborate pentahydrate.

Where a borate inhibitor is added care must be taken to keep the pH well below 4.9 or gellation may occur. It is preferable in preparing the aqueous solution of polyvinyl alcohol to maintain the pH at or about 3.5. This may be done by the addition of phosphoric acid.

In order to prevent freezing of the composition during the winter months, an antifreeze component, preferably ethylene or diethylene glycol, is added. The ratio of glycol to water by volume is from about 40:60 to about 60:40. At the latter ratio the composition will remain in liquid form down to about −60° F. The former ratio will prevent freezing down to about −30° F.

A bactericide such as benzyl bromoacetate, for example MERBAC 35 manufactured by Merck Company of Rahway, N.J., may also optionally be added to the aqueous polyvinyl solution. DOWICIDE A, manufactured by the Dow Company may also be used.

Finally, if it is desired to color the tire sealing and balancing composition a dye compatible therewith such as thalo blue dye may be added.

EXAMPLE

A 2,000 gallon batch of sealing and balancing solution is prepared in the following manner.

Fan 400 pounds of polyvinyl alcohol into 400 gallons of cold ethylene glycol in a 2,000 gallon tank while the ethylene glycol is being stirred and continue stirring for about 15 minutes. The temperature of the cold ethylene glycol is from about 50° to about 90° F.

Then add 400 gallons of hot water (170° − 190° F.) while continuing the stirring. Continue the stirring after addition of the water. Stirring should be constant and for about one hour including the addition time.

Adjust the pH to 3.5 with concentrated (75 − 85%) phosphoric acid and stir for 2 hours. Then let the solution stand overnight or about 12 hours or more.

Add 300 more gallons of cold ethylene glycol to the solution while stirring.

Dissolve 30 pounds of potassium dichromate and 30 pounds of sodium tetraborate pentahydrate in hot water and add to the solution.

Check the pH of the resulting solution and, if necessary, adjust the pH to about 3.5. Phosphoric acid may be used for this purpose.

Mix 800 pounds of asbestos fibers with 40 pounds of fiberglass fibers and soak the mixture in 200 gallons of water containing a wetting agent for about 2 hours. ADVOWET-33, a non-ionic non-foaming activating wetting agent manufactured by Advance Solvents and Chemical Corporation of New York, New York, is a suitable wetting agent. One pint of ADVOWET-33 is dissolved in 5 gallons of water and then one gallon of this solution is added to the 200 gallons of water used for soaking.

After the asbestos-fiberglass mixture has been soaked at least 2 hours, the fibers including water and wetting agent are combined with the solution with stirring.

Fifteen pounds of benzyl-bromoacetate (MERBAC-45, manufactured by the Merck Chemical Company of Rahway, N.J. is mixed with 5 gallons ethylene glycol and the resulting mixture is added to the fiber-containing solution.

For color, 2 gallons of thalo blue dye are added.

The fiber-containing-solution is stirred for about 4 hours.

The resulting tire sealer and balancer is ready for introduction into a tire. Introduction is most simply and conveniently effected through the valve stem.

Ordinarily about 2–5% by volume of the composition is injected into the tire. For example, a 6.00 × 16 tire (commonly used for such as pick-up trucks or passenger cars) would be supplied interiorly with 16 ounces of the composition; as respects larger tires, for example a truck tire of a 4 feet diameter, 56 ounces of the tire sealer and balancer would be injected into the tire.

Although other alternates and substitutes may be made without departing from the spirit of the invention, it is to be understood that the scope thereof is to be measured only by the limitations of the several claims appended hereto.

What is claimed is:

1. A tire sealing and balancing composition having a viscosity of from about 1000 to about 2200 cps at 100° F., said composition comprising from about 2% to about 8% by weight of a fibrous component containing asbestos fibers of from about 0.01 to about 3.0 inches in length and fiberglass fibers of about 0.25 inches to 0.125 inches in length the ratio of asbestos fibers to fiberglass fibers being from about 20:1 to about 100:1 and an aqueous solution of a water soluble polyvinyl alcohol wherein the ratio by weight of polyvinyl alcohol to water is from about 0.5:100 to about 5.0:100.

2. The tire sealing composition of claim 1 further characterized in that the polyvinyl alcohol is from 98.0% to 98.8% hydrolyzed polyvinyl acetate and, in a 4% by weight aqueous solution, has a viscosity of 28–32 cps as measured with a Brookfield viscometer, Model LVF, #1 spindle, 60 rpm, 20° C.

3. The tire sealing composition of claim 1 further characterized in that the polyvinyl alcohol is from 87.0% to 89.0% hydrolyzed polyvinyl acetate, and a 4% solution of same has a viscosity of 28–32 cps as measured with a Brookfield viscometer, Model LVF, #1 spindle, 60 rpm, 20° C.

4. The tire sealing component of claim 2 further characterized in that the ratio by weight of polyvinyl alcohol to water is from about 0.5:100 to about 5.0:100.

5. The tire sealing component of claim 2 further characterized in that the ratio by weight of polyvinyl alcohol to water is from about 0.5:100 to about 1.0:100.

6. The tire sealing component of claim 5 further characterized in that the liquid component contains an antifreeze additive.

7. The tire sealing component of claim 6 further characterized in that the antifreeze additive is ethylene or diethylene glycol, the ratio by volume of said additive to water being from about 40:60 to about 60:40.

8. The tire sealing component of claim 3 further characterized in that the ratio by weight of polyvinyl alcohol to water is from about 0.5:100 to about 5.0:100.

9. The tire sealing component of claim 2 further characterized in that the ratio by weight of polyvinyl alcohol is from about 0.5:100 to about 1.0:100.

10. The tire sealing component of claim 9 further characterized in that the liquid component contains an antifreeze additive.

11. The tire sealing component of claim 10 further characterized in that the antifreeze additive is ethylene or diethylene glycol, the ratio by volume of said additive to water being from about 40:60 to about 60:40.

12. The tire sealing component of claim 1 further characterized in that it also contains potassium dichromate, sodium tetraborate pentahydrate or mixtures thereof as a rust preventative.

13. The tire sealing component of claim 1 further characterized in that the liquid component contains from 0.05 to about 1.5 percent, as an anti-foaming agent.

* * * * *